July 12, 1960    C. R. MATTHEWS    2,944,836
RETRACTABLE TRAILER HITCHES
Filed Aug. 7, 1958
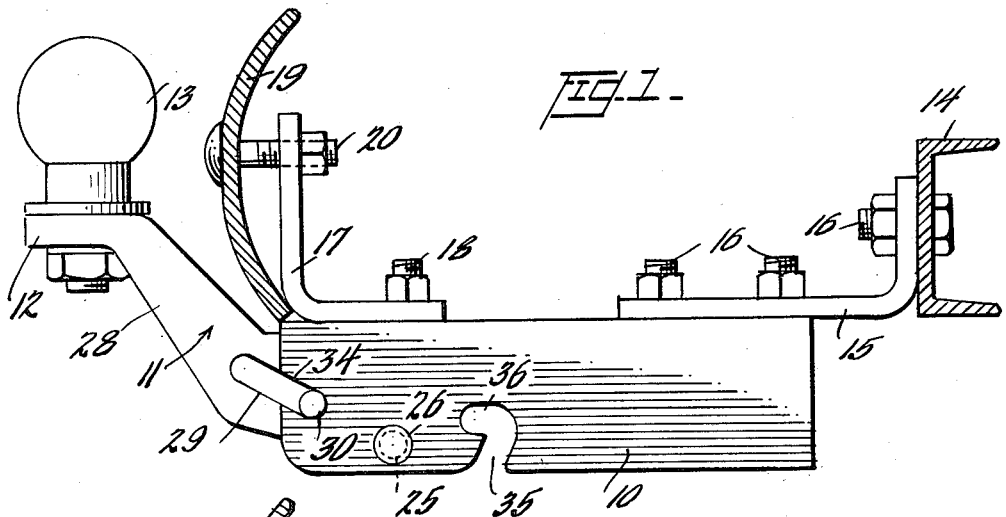
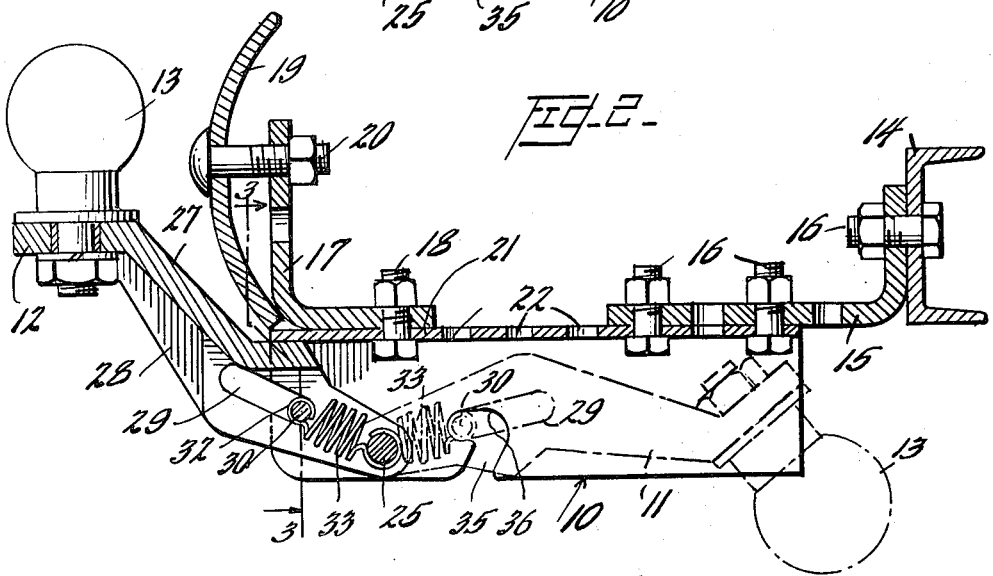
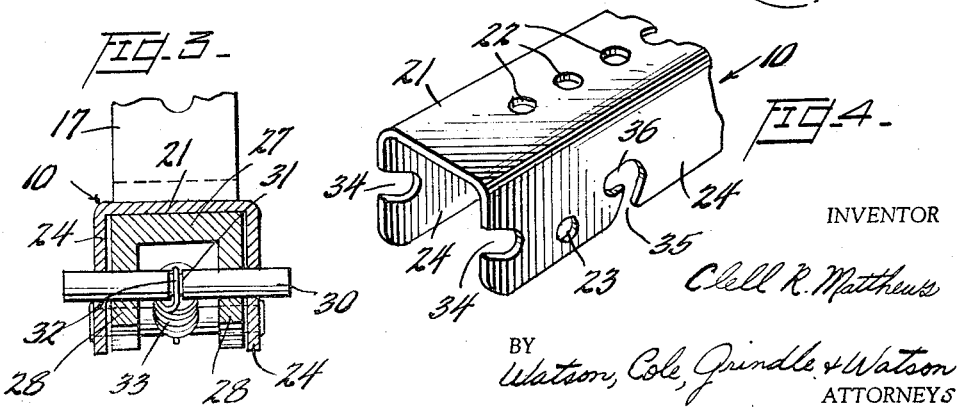
INVENTOR
Clell R. Matthews
BY
Watson, Cole, Grindle & Watson
ATTORNEYS United States Patent Office 2,944,836
Patented July 12, 1960

2,944,836

RETRACTABLE TRAILER HITCHES

Clell R. Matthews, Warsaw, Ind., assignor to The Dalton Foundries, Inc., Warsaw, Ind., a corporation of Indiana Filed Aug. 7, 1958, Ser. No. 753,834

1 Claim. (Cl. 280—491)

This invention relates to trailer hitches for automotive vehicles, particularly of the type known as frame hitches, wherein a member subjected to the towing stresses is secured directly to the frame of the towing vehicle, rather than to the rear bumper thereof, only.

The general object of the invention is the provision of such a device in which the towing stresses are transmitted through two articulated members which are so related that one of them may be rigidly affixed to the towing vehicle in such a way as to lie wholly within the horizontal profile thereof, while the other member is extendable rearwardly when in use, but retractable forwardly when not in use so that it, too, lies wholly within the horizontal profile of the towing vehicle and is removed from the path of persons or vehicles passing close by the rear of the said towing vehicle.

More specifically, it is an object of the invention to provide a retractable trailer hitch comprising a body portion rigidly attached to the towing vehicle and a tension member swingably mounted on said body portion and movable between said extended and retracted positions, in combination with simple and easily operated means for latching the tension member firmly in either of said positions; said latching means comprising a spring-urged pin movable in closed slots formed in said tension member and movable into and out of engagement with open-ended slots formed at two spaced locations in said body portion, on opposite sides of the pivotal connection between the body portion and tension member.

Other and further objects, features and advantages will be apparent from the description which follows, read in connection with the accompanying drawings in which:

Figure 1 is a side elevation of a trailer hitch constructed according to the present invention;

Figure 2 is a vertical longitudinal section taken centrally of the device illustrated in Figure 1;

Figure 3 is a fragmentary transverse section on line 3—3 of Figure 2; and

Figure 4 is a fragmentary perspective view of the body portion of the device.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The trailer hitch of the present invention comprises generally a body portion 10, and tension member 11, the latter being formed to provide a platform 12 for the ball 13 of a conventional ball and socket coupler, the socket portion of which is carried by the towed vehicle or trailer. The body portion 10 is securely affixed, at its forward end, to a rear frame member 14 of the towing vehicle by means of an adjustable bracket 15 and bolts 16. The rearward end of the body portion 10 carries a bracket 17 secured thereto by bolt 18, the bracket 17 being similarly fastened to the rear bumper 19 of the towing vehicle by means of bolt 20. The body portion is thus rigidly, though detachably, secured to the towing vehicle and, in normal usage, will remain permanently in such relation.

The body portion 10 is preferably formed of channel section material, as best seen in Figure 4, the web 21 of the channel being provided with a plurality of spaced bolt holes 22 for adjustably mounting the brackets 15 and 17. The tension member 11 is pivotally mounted in apertures 23 formed in the respective flanges 24 of the body portion 10, by means of a pivot pin 25, the ends of which may be peened as at 26 (Figure 1) after the device is assembled. The tension member 11, like the body portion 10, is preferably of substantially channel section, having a web 27 merging with the platform 12, and downwardly extending flanges 28 at either side. The flanges 28 are provided with opposed elongated slots 29 to accommodate a latching pin 30 which extends through the said slots and projects laterally outside the tension member on either side thereof (Figure 3). The latching pin 30 has an annular notch 31 disposed centrally thereof to receive the terminal loop 32 of a coil spring 33, the other end of which encircles the pivot pin 25. The tension of the spring 33 is such that the latching pin 30 is at all times urged toward the pivot pin 25.

Referring now to Figure 4, it will be seen that the flanges 24 of the body portion 10 are provided, at their rearward edges, with transversely aligned open-ended slots 34 which are of a transverse dimension to receive the latch pin 30, the slots 34 being preferably slightly inclined downwardly and forwardly. The flanges 24 are further provided, at points forwardly of the pivot apertures 23, with transversely aligned slots 35 which extend generally vertically into the respective flanges for a short distance, thence rearwardly to provide locking coves or indentations 36. The innermost portions of the slots 34 and coves 36 are approximately equidistant from the pivot pin apertures 23, so that the tension of the spring 33 is approximately the same whether the latch pin 30 is seated in slots 34 or in coves 36.

From the foregoing description it is believed that the operation of the trailer hitch will be readily understood. When it is desired to use the trailer hitch to couple a trailer to the towing vehicle, the tension member 11 is swung into the position illustrated in Figures 1 and 2, and the latch pin 30 is seated in slots 34 under the tension of the spring 33. In this position the tension member 11 is in effect a rigid extension of the body portion 10. When the towing operation is completed and the trailer detached, it is desirable to retract the tension member 11 so that the entire trailer hitch will be disposed within the normal horizontal profile of the vehicle, and will have no projecting parts to be struck or damaged by another vehicle approaching too closely from the rear, or to be struck by, and cause injury to, a person walking around the rear of the towing vehicle. To retract the tension member 11 the latch pin 30 is manually drawn out of the slots 34 against the tension of spring 33 and the tension member 11 swung to the position illustrated in broken lines in Figure 2, the latch pin 30 entering through the slots 35 into the coves 36 and being retained therein by the tension of spring 33.

By reason of the adjustability of brackets 15 and 17, the body portion 10 of the present trailer hitch may be rigidly secured between the frame and rear bumper of practically any make and model of automobile in use today, in such a way that the body portion will lie wholly within the normal horizontal profile of the vehicle. As a result, when the tension member 11 is retracted as described above, the entire trailer hitch lies within said profile, and presents no projections which can be struck by a vehicle or person approaching or passing around the rear end of the towing vehicle.

Having thus described the invention, what is claimed as new and desired to be secured by Letters Patent is:

Automotive coupling device comprising a body portion of channel section including a horizontal web and downwardly extending flanges, means for securing said body portion to a towing vehicle, a tension member of channel section having a web and flanges pivoted on a horizontal axis, adjacent one end of said member, to the body portion at a point toward the rearward end thereof, the other end of said tension member being formed to provide a mounting for a coupler member, and means for latching said tension member in extended position for use in towing a trailer or in retracted position substantially coextensive with said body portion, said latching means comprising open-ended slots in the flanges of said body portion, a pin extending transversely of said tension member and movable longitudinally thereof in closed slots formed in the flanges of said tension member, and spring means connected to said pin and anchored relative to said body portion for urging said pin inwardly of said open-ended slots, said open-ended slots comprising pairs of slots formed in the edges of the respective flanges of said body member, one said pair at the rearward end of said flanges and the other said pair at transversely aligned points in the lower edges of said flanges and disposed forwardly of said pivot, said last slots being of inverted L-shape, said web of said tension member being of a transverse dimension less than the distance between the flanges of said body portion whereby said tension member is received between said flanges when in retracted position, said spring means lying between the flanges of said tension member, and said tension member, when retracted, lying substantially entirely between the flanges of said body portion.

References Cited in the file of this patent
UNITED STATES PATENTS

| | | |
|---|---|---|
| 2,571,390 | Strand | Oct. 16, 1951 |
| 2,604,331 | Kingston | July 22, 1952 |
| 2,849,243 | Halverson | Aug. 26, 1958 |

OTHER REFERENCES

Boats, vol. 55, issue I, January 1958, page 190, Atwood Vacuum Machine Co. advertisement.